United States Patent [19]

Appelbaum

[11] Patent Number: 5,077,995
[45] Date of Patent: Jan. 7, 1992

[54] LOCK FOR SPARE TIRE HOIST

[76] Inventor: Paul Appelbaum, 34591 Camino Capistrano, Capistrano Beach, Calif. 92718

[21] Appl. No.: 670,571

[22] Filed: Mar. 18, 1991

[51] Int. Cl.$^5$ .................. B62D 43/04; E05B 65/12
[52] U.S. Cl. ............................ 70/259; 224/42.21; 224/42.25; 414/463
[58] Field of Search ............. 70/259, 260, 14, 225, 70/158, 234; 224/42.06, 42.21, 42.23, 42.25; 414/463

[56] References Cited

U.S. PATENT DOCUMENTS

| | | | |
|---|---|---|---|
| 2,594,407 | 4/1952 | Earnest | 70/259 |
| 3,372,821 | 3/1968 | Podhajsky | 70/232 X |
| 4,526,021 | 7/1985 | Princell | 70/259 X |
| 4,988,023 | 1/1991 | Heathcoat | 224/42.23 X |

Primary Examiner—Lloyd A. Gall
Attorney, Agent, or Firm—Charles C. Corbin

[57] ABSTRACT

Disclosed is locking apparatus for use on a vehicle that mounts a spare tire on a hoistable carrier mounted under the lower rear end of the vehicle, near the near bumper, the tire carrier being lowerable to a position that gives access to the spare tire, by use of a hand crank that is connectable to the hoist by way of a hole in the bumper. The hoist mechanism for the tire carrier includes a longitudinally extending horizontal drive shaft having a beveled rear end adapted to be engaged by the hand crank shaft. The disclosed locking apparatus is adapted to releasably cover the beveled end of the hoist shaft, and includes a cylindrical latch rod having a front end adapted to engage the beveled end of the hoist shaft, and a socketed rear end that is adapted to abut the vehicle bumper adjacent the bumper hole. There is a generally cylindrical latch pin containing locking mechanism and having a key-way at one end and a depressible and retractable locking arm extending laterally from a forward portion of the pin, which forward portion can lockably engage the socketed end of the latch rod. The rear portion of the pin is receivable in the bumper opening. There is a locked position in which the latch rod engages the beveled end of the hoist shaft, the latch pin lockably engages the latch rod and the rear portion of the pin engages the bumper opening.

8 Claims, 1 Drawing Sheet

LOCK FOR SPARE TIRE HOIST

BACKGROUND OF THE INVENTION

1. Field of the Invention

The present invention relates to devices for preventing access to a spare tire mounted in a hoistable carrier below the rear part of a vehicle.

2. Description of the Prior Art

In many late model pick-up truck models a spare tire is stored on a hoist-equipped carrier under the rear of the truck frame. According to these designs a spare tire may be placed in a lowered carrier and then the carrier may be hoisted to a tuck position which secures the tire against removal. The hoist mechanism includes a rearwardly extending drive shaft having a female end which may be engaged in drive relationship by the male end of a portable crank that is insertible through a hole in the rear bumper to accomplish this. A major drawback of such tire carriers is insufficient security. Unfortunately, substitute handles have been frequently used for unauthorized lowering of the spare tire carrier. Various attempts have been made to combat this problem but they all have shortcomings. For example, one method of securing the spare tire is to use a chain and padlock to lock the carrier in its tuck position. Unfortunately this can be cumbersome, and requires one to crawl under the vehicle in order to properly attach the lock and chain, which items in any event are susceptible to being sheared by cutting tools, such as bolt cutters.

SUMMARY OF THE INVENTION

In view of the aforestated prior art drawbacks it is a general object of the present invention to provide releasably lockable means for preventing access to the hoist of a spare tire carrier.

Another object of the invention is to provide a locking apparatus for preventing the use of a substitute crank on a tire carrier hoist.

Yet another object of the invention is to provide lock apparatus for a spare tire hoist which is simple to use and highly effective.

These and other objects and advantages can be accomplished by the present invention which comprises apparatus for preventing access to the hoist mechanism for a spare tire carrier, the hoist mechanism including a rearwardly extending drive shaft with a beveled end that is shaped and adapted to be engaged by the end of a portable hand crank that has been extended through a hole in the vehicle's rear bumper.

The invention features a cylindrical latching rod with a forward end that is shaped and adapted to be received in the beveled end of the hoist shaft. This rod has a socket construction at its rear end including an internal forwardfacing edge. The rear end of the latch rod is larger than the bumper hole and is adapted to engage the periphery of the bumper hole. The invention also features a cylindrical lock pin which contains a locking mechanism with a key-way at the rear end of the lock pin and a depressible locking arm extending laterally from the forward end of the lock pin, the pin being resiliently depressible in a direction normal to the pin axis and also being retractable by operating the lock mechanism with a key. The front end of the pin is adapted t make engagement with the socket of the latch rod whereby the locking arm will abut the forward-facing edge of the socket to hold the pin against outward movement while permitting the pin to be inclined by an appreciable amount with respect of the axis of the rod. The rear end of the pin is adapted to fit in the bumper hole. These components have a hoist-locking configuration in which the front of the rod engages the beveled end of the hoist shaft, the forward end of the pin being engaged in the rod socket, and the rear portion of the pin residing in the bumper hole. When in the hoist-locking configuration the rear end of the rod will abut the periphery of the bumper hole to hold the rod against general rearward movement. In this locked configuration the joined components will act to lock access to the beveled end of the hoist shaft as well as locking the bumper hole.

DETAILED DESCRIPTION OF THE DRAWINGS

Figure 1:
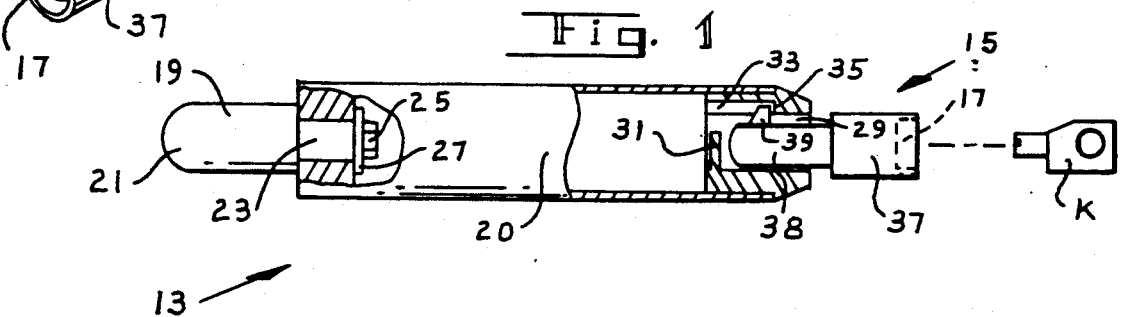
FIG. 1 is a partial, sectional side elevational view showing both components of a preferred embodiment of the invent connected relationship.

Referring now to the drawings, FIG. 1 shows that the main components of a preferred embodiment of the invention are a cylindrical latch rod 13 and lock pin 15 with pin 15 having a key-way at 17 for conventional lock mechanism within pin 15, and which key-way is engagable by a key K. Latch rod 13 is fabricated primarily of steel using known metal-working techniques and has a tubular structure, and a front end in which is affixed a cylindrical nose member 19, preferably constructed of a durable plastic material and having a rounded tip at 21. A narrower portion 23 of member 19 is received in a bore in the front end of the tubular body 20 as illustrated and bolt 25 and washer 27 serve to hold member 19 in place.

FIG. 1 also shows the rear end of latch rod 13 having an open socket configuration with a generally tubular socket 29, a restraining member 31 which is spaced a certain distance forward of the rear end of socket 29. As FIG. 1 shows the upper wall of the socket 29 includes a longitudinal slot 33 and an adjoining forward-facing edge 35.

Figure 2:
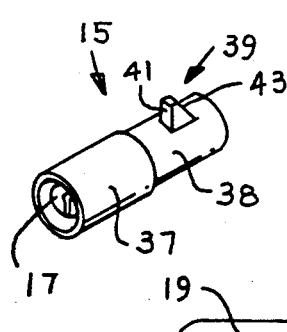
FIG. 2 is a perspective view of a lock pin according to the invention.

As FIGS. 1 and 2 show, the lock pin 15 has a major cylindrical surface at 37 and includes a cylindrical front portion 38 that mounts a retractable locking arm 39 which may be resiliently depressed in a lateral direction into the body of pin 15, and which has an upright edge 41 which will be seen to be adapted to make locking engagement with edge 35 and a sloped edge 43 which is adapted to make sliding, and camming contact with socket 29 when pin 15 engages socket 25 in a manner that will be described. Arm 39 is connected to internal locking mechanism (not shown) and a key K can engage key-way 17 and be turned to cause arm 39 to retract.

Figure 3:
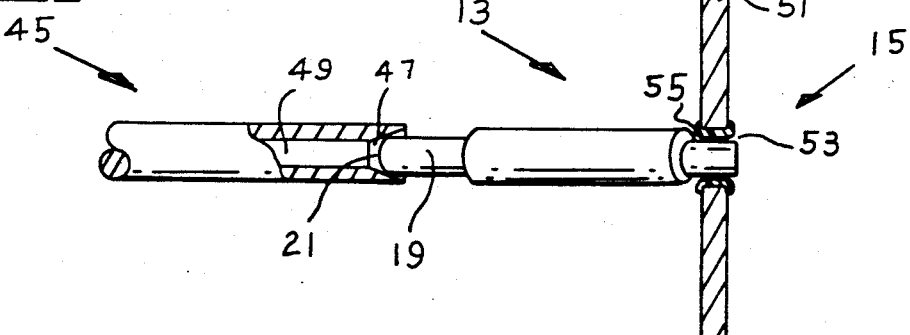
FIG. 3 is a fragmented, partial, sectional side elevational view illustrating the locked configuration of apparatus according to the present invention.
Figure 4:
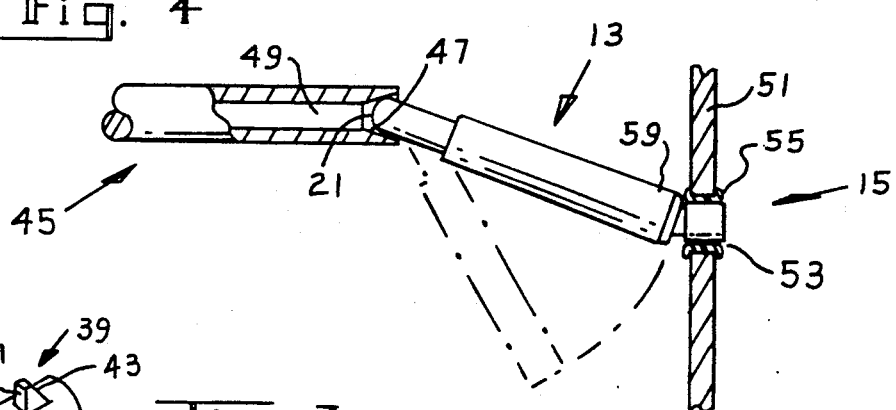
FIG. 4 is a fragmented, partial, sectional top view of the apparatus shown in FIG. 3.

In FIG. 3 and 4 the reference numeral 45 represents the rearwardly extending rearward portion of a drive shaft for a hoist mechanism (not shown) for a spare tire carrier. FIGS. 3 and 4 also show that shaft 45 has a beveled end 47 which adjoins a shaped core 49 that has a square cross-section and that is designed to be engaged by the male end of a portable hoist hand crank (not shown). Reference numeral 51 represents the rear bumper of the vehicle. There is a circular aperture at 53 over which is mounted a polymeric grommet 55. The shaft of a crank (not shown) may be extended through aperture 53 to make driving connection with the core 49 of drive shaft 45. Note that the top plan view of FIG. 4 shows that the bumper aperture 53 is ordinarily laterally offset from the axis of shaft 45, in order to avoid interference with the vehicle rear license plate not shown.

By reference to FIG. 4 it can be appreciated that the length of rod 13 is such that when nose member 19 engages beveled end 47 its rear end can be moved to abut bumper 51 at the periphery of aperture 53. Note that the end 59 is appreciably larger than the diameter of aperture 53.

It will also be seen that the cylindrical surface 37 of lock pin 15 is sized to be fairly snugly fitted within aperture 53.

Figure 6:
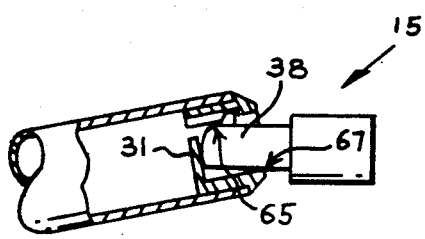
FIG. 6 is a view similar to FIG. 5 but showing inclination of components in an opposite direction.
Figure 5:
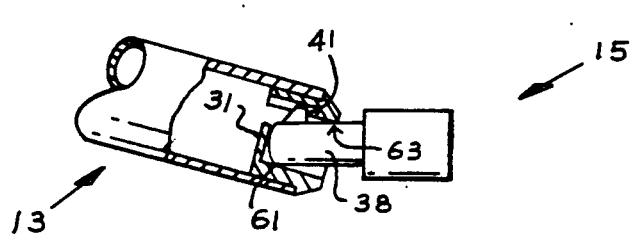
FIG. 5 a fragmented, partial, sectional side view illustrating inclination of the components of the invention.

FIG. 1 illustrates how the lock pin 15 can be connected to latch rod 13. When the locking arm 39 is aligned with slot 33 the pin forward portion 38 may be urged into the socket 29 of the latch rod 13. During insertion the sloped surface 43 will slidably engage inside surfaces of socket 29 so as to resiliently depress the arm 39. When fully inserted into slot 33 as shown, arm 39 will spring to its fully extended position. Note that the diameter of portion 38 of pin 15 is appreciably smaller than the diameter of the socket 29, and that there is deliberate spacing between the restraining wall 31 and the front end of the pin 15. Arm 39 also has a somewhat loose fit longitudinally and laterally within the slot 33, however the upright edge 41 of locking arm 39 will abut the edge 35 to hold pin 15 against being removed from the rod 13. The aforementioned clearances will allow pin 15 to be maneuverable and to be inclined with respect to the axis of rod 13 to a limited extent in all directions. FIG. 5 illustrates the inclination in one direction in which mutual engagement of components at 61 and 63 will frictionally hold the parts against further inclination. FIG. 6 shows the inventive components inclined in the opposite direction with abutting engagement at 65 and 67 to limit further inclination. In all cases the restraining wall 31 will be engagable by the front end of pin 15 to limit forward insertion of pin 15.

In order to use the aforedescribed apparatus to secure a spare tire hoist, the latch rod 13, with lock pin 15 separated therefrom, is placed so that rounded tip 21 is in the beveled end 47 of drive shaft 45, as shown in FIGS. 3 and 4. The rear end 59 of rod 13 may then be rotated to a position where it lies adjacent the inside of the bumper aperture 53. The lock pin 15 may then be inserted forwardly through the aperture 53 from the rear side of bumper 51, and its forward portion 38 pressed into engagement with the socket 29 of rod 13 in the manner aforedescribed. Because aperture 53 is offset from the drive shaft 45, as shown in FIG. 4, the pin 15 will be inclined to the rod 13 as shown. When locked in this manner the rod end 59 will abut bumper 51 around the periphery of aperture 53 to prevent rearward movement of rod 13. Thus, with the tip 21 residing in the beveled end 47 of the drive shaft 45, access to the core 49 will be prevented. In order to unlock the apparatus, the key K is turned in keyway 17 to retract locking arm 39 allowing pin 15 to be rearwardly withdrawn from the rod 13. Rod 13 may then be 15 swung as illustrated in FIG. 4 and removed from the drive shaft 45.

While a particular embodiment of the invention has been illustrated there are variations and modifications of the invention that will occur to those skilled in the art. It is intended that all such variations be covered as fall within the full scope and spirit of the invention.

What is claimed is:

1. Apparatus for preventing unauthorized access to the turn-shaft of a hoist mechanism for a spare tire carrier mounted below the rear end portion of a motor vehicle near its rear bumper, said turn-shaft extending generally longitudinally and horizontally and having a beveled rear end portion, which end portion is shaped internally for engagement by a hand-operated crank and wherein there is a generally circular opening in said bumper for receiving the shaft of said hand crank, said bumper opening being spaced to the rear of the beveled end of said hoist turn-shaft, said apparatus comprising:

a) latch rod, having a generally cylindrical body with a front end portion that includes a rounded tip which is adapted to be received in the beveled end and of said hoist turn-shaft, said latch rod having a rear portion having a socket, and said rod rear portion being larger than the diameter of said bumper opening and adapted to abut said bumper at the periphery of said opening; and b) generally cylindrical locking post, containing key operated locking mechanism with a key-way at one end of said post, said post having a forward portion that mounts a depressible locking arm that extends generally at right angles to the axis of said post, said post being adapted to fit in said bumper opening, and wherein the forward portion of said post is adapted to be releasably secured within said socket with a fit that is sufficiently loose to allow said post, secured in said socket, to be inclined appreciably to the axis of said latch rod, and wherein said apparatus has a locked position in which said rounded tip of said latch rod engages said beveled end of said hoist shaft, and the rear end of said rod abuts said bumper at the periphery of said bumper opening, the front end of said post being releasably secured in said socket and said post being mounted in said bumper opening.

2. Apparatus as defined in claim 1 wherein said front end portion of said latch rod is of a polymeric material, and the remaining components of said latch rod are metallic.

3. Apparatus as defined in claim 1 wherein said locking arm is resiliently depressible and has a sloped surface for slidably engaging walls of said socket to depress said arm during insertion in said socket, whereby when said post forward portion is fully inserted in said socket, said arm is fully extended so as to engage the inside of said socket and hold said post against outward movement from said socket.

4. Apparatus as defined in claim 1 wherein sides of the forward portion of said post are adapted to engage the inside of said socket when said post is inclined with respect to said rod, to hold against further inclination.

5. Apparatus as defined in claim 1 wherein the locked position of said apparatus will block access to the beveled end of said hoist shaft.

6. Apparatus as defined in claim 3 wherein the diameter of the forward portion of said post is substantially smaller than the diameter of said socket.

7. Apparatus as defined in claim 3 wherein said socket is adapted to allow a predetermined amount of limited longitudinal and lateral movement of said fully extended locking arm within said socket.

8. Apparatus as defined in claim 1 wherein said bumper opening is spaced laterally with respect to the axis of said hoist turn-shaft.

* * * * *